United States Patent
Kelley et al.

(10) Patent No.: US 7,399,453 B2
(45) Date of Patent: Jul. 15, 2008

(54) DISCHARGE REACTOR FUSE LINK

(75) Inventors: Timothy Kelley, Milton, NH (US); Giovanni Paradiso, Greenland, NH (US)

(73) Assignee: Powerspan Corp., Portsmouth, NH (US)

( * ) Notice: Subject to any disclaimer, the term of this patent is extended or adjusted under 35 U.S.C. 154(b) by 946 days.

(21) Appl. No.: 10/495,584

(22) PCT Filed: Nov. 15, 2002

(86) PCT No.: PCT/US02/36834

§ 371 (c)(1),
(2), (4) Date: May 14, 2004

(87) PCT Pub. No.: WO03/041855

PCT Pub. Date: May 22, 2003

(65) Prior Publication Data

US 2005/0034973 A1    Feb. 17, 2005

(51) Int. Cl.
*B01J 19/08* (2006.01)

(52) U.S. Cl. .............................. 422/186.15; 422/186.28

(58) Field of Classification Search . 422/186.07–186.2, 422/186.28
See application file for complete search history.

(56) References Cited

U.S. PATENT DOCUMENTS

| 4,293,775 A | 10/1981 | Feuerstake et al. | 250/535 |
|---|---|---|---|
| 4,296,397 A | 10/1981 | Sedberry | 337/199 |
| 4,617,544 A * | 10/1986 | Mooz et al. | 337/3 |
| 5,882,609 A | 3/1999 | Shiota et al. | 422/186.07 |
| 6,222,715 B1 * | 4/2001 | Gruhn | 361/103 |

* cited by examiner

*Primary Examiner*—Kishor Mayekar
(74) *Attorney, Agent, or Firm*—Phillip E. Decker; Mesmer & Deleault, PLLC

(57) ABSTRACT

A fuse for an electrical discharge reactor made up of a fuse apparatus (10) and a power supply shut down procedure. The fuse apparatus (10) has an end cap (12) that encloses a spring (30) and a rivet (13) or piercing end (14) that is electrically connected to an arcing tube (18), secured to a near end of a strain wire (20), a lower terminal (32) secured to a far end of the strain wire (20), and a contact (24) that is electrically connected to the lower terminal (32). Preferably, the arcing tube (18), strain wire (20), and lower terminal (32) are sheathed in a structure (16) that provides support and electrical insulation such as a quartz tube while ensuring protection of the fuse internal components from the corrosive environment. The power supply shut down procedure includes a synchronized power supply response that lowers the current limit (52) for a set duration to allow the fuse apparatus to clear (54), and then shuts off the current completely (56) for about one second to quench any sustained arcs prior to resuming operations (60).

6 Claims, 3 Drawing Sheets

DISCHARGE REACTOR FUSE LINK

This application is a 35 U.S.C. 371 National Stage filing of PCT/US02/368341 on Nov. 15, 2002.

BACKGROUND a. Field of the Invention

This invention relates to methods and apparatuses for providing a fusible link for electrical discharge reactors, particularly dielectric barrier discharge reactors.

b. Description of the Related Art

Electrical discharge reactors are used for many purposes, including the production of ozone and ultraviolet light, and for the destruction of noxious substances in gaseous emissions. A dielectric barrier discharge ("DBD") reactor may comprise multiple tubes configured in an array similar to a tube and shell heat exchanger. DBD is synonymously known as silent discharge or non-thermal plasma discharge. In such a multi-tube DBD reactor, a high voltage electrode is centered within a ground tube creating an annulus or air gap between the electrode and ground tube. When the electrodes are energized, a barrier discharge is generated by the application of a voltage potential between a high voltage source through at least one dielectric barrier, including the air gap to the ground tube that is at ground potential.

In a reactor for destroying pollutants, gases containing pollutants are passed through this air gap and are oxidized by the discharge that creates oxygen and hydroxyl radicals. The ground tubes of such a DBD reactor also act as a heat exchanger since some of the energy generated by a barrier discharge is converted to heat and therefore can be dissipated through the ground tubes. For this intended application, DBD reactors normally operate at voltages up to about 60 kV AC peak-to-peak at a frequency between about 1.6 kHz and 2.4 kHz.

DBD reactors in industrial applications have a large number of electrodes and ground tubes so that they can treat all the fluid from an industrial process, for example, flue gas from the boiler of a fossil fueled power plant. A plurality of reactors may be used, and may be provided in modules to facilitate their manufacture and installation. All the electrodes of at least one module are preferably wired in parallel to a power supply to minimize the number of power supplies necessary. The preferred embodiment is a DBD reactor that multiple electrodes wired in parallel. The term "power supply" as used herein refers to a device that converts electricity found in standard industrial electrical systems to the voltage and frequency required to energize discharge reactor electrodes as well as provide various key operating control functions.

During normal reactor operation, dielectric failures can occur. These failures are generally the result of localized heating of the dielectric material, which in the preferred embodiment is fused silica, or quartz. Other materials having a high dielectric constant can be also used, which is readily appreciated by those having skill in the art. Since the dielectric strength of a material is temperature dependent, excessive heating of the dielectric can reduce the dielectric strength of the material to a point where the material can no longer stand off the voltage necessary to maintain a barrier discharge. This condition is known as thermal dielectric breakdown. The result of a dielectric breakdown is usually a puncture through the dielectric material which provides a direct electrical path to ground. This direct path to ground becomes the path of least resistance creating a short circuit, which results in all of the energy from the power supply being delivered to the failed electrode. The energy transferred to the short circuit can be sufficient to result in additional melting of the dielectric and/or puncture of the ground tube.

Prior to the use of the present invention, when a dielectric failure occurred, the power supply was required to be de-energized once the short circuit was detected by the power supply controller. This feature is typically built into the power supply controller to prevent damage to the power supply and/or reactor components. After a short circuit was detected, it was then necessary to bring the unit off line. Personnel would then lockout all energy sources, open up the reactor housing, test the air quality for suitability for human occupation, and search for the failed electrode. This necessary exercise usually resulted in at least a day of lost operations when required cool-down and heat-up cycles are taken into consideration.

Many industrial processes can use the benefits of electrical discharge reactors. However, many industrial processes require consistent, continuous operation. For example, de-energizing the DBD reactors for any length of time in a fossil fueled power plant would also require shutting down the boiler, resulting in a substantial loss of electricity generation revenue.

Electrical discharge reactors are often used in ozone generators. Ozone generators, which typically operate at 15 kV peak-to-peak, have used fuses to isolate a particular failed electrode tube. An example of such a fuse is found in U.S. Pat. No. 4,293,775 that issued on Oct. 6, 1981, to Feuerstake et al. Feuerstake teaches, among other things, that prior art fuses sometimes blow when no tubes have failed. In addition, sometimes electrode tubes fail and none of the fuses blow. Feurerstake's solution was to add a resistance element in series with the fuse element. This may have been an acceptable solution for electrical discharge reactors operating at 15 kV peak-to-peak, but it has been found not to work in reactors that operate at much higher voltages such as 60 kV peak-to-peak. The problem is that the electrical resistance of the air breaks down, and an arc crosses the gap between the space once occupied by the fuse material.

Reactor fuses may have to operate in a corrosive environment that may tend to either prevent a fuse from blowing or causing a fuse to blow prematurely. This problem was addressed in U.S. Pat. No. 4,296,397 that issued on Oct. 20, 1981, to Sedberry. Sedberry's solutions were primarily applicable to ozone generators, because it is known that ozone can be corrosive. Sedberry's solutions were to use an ozone corrosion-resistant fuse wire, and to encapsulate the fuse in a closed, tubular housing. Sedberry also mentioned the added benefit that rigid insulator spacing, terminals, and fuse wire can be provided as a unitary structure. However, like Feuerstake, Sedberry discloses that ozonators operate at lower voltages than that used for pollution control, reciting a range between 6 kV peak-to-peak and 22 kV peak-to-peak. There is no mention of the suitability of his invention for other corrosive environments, including NOx, $SO_2$, acids, and fine particles.

What is needed, therefore, is a fuse means to isolate an individual electrode from the power supply circuit that operates at high voltage to permit the remaining electrodes to operate unimpeded. With the use of such fuse means, electrode maintenance can be delayed until the reactor is taken off line for maintenance during a scheduled outage. It is also beneficial to ensure that the appearance of the fuse from a failed electrode be significantly different from that of an intact fuse in order to aid the maintenance personnel in locating and replacing the failed components. Therefore, it is advantageous if the fuse assembly is a unitary structure, a failed fuse assembly is easily discernible from intact fuse assemblies, and is unaffected by corrosive environments.

SUMMARY

The present invention is directed to a method and apparatus for providing fuse protection to an electrical discharge reactor. An apparatus according to the present invention comprises an electrode cap that encloses a spring and a rivet that is in electrical communication with an arcing tube, secured to a proximal end of a strain wire, a lower terminal secured to a distal end of the strain wire, and a contact that is in electrical communication with the lower terminal. Preferably, the arcing tube, strain wire, and lower terminal are sheathed in a structure that provides support, protection from corrosive environments, and electrical insulation such as a quartz tube. The method includes a synchronized power supply response that allows the apparatus to operate as a fuse. These and other features, aspects, and advantages of the present invention will become better understood with reference to the following description and drawings.

DRAWINGS

DESCRIPTION

Figure 1:
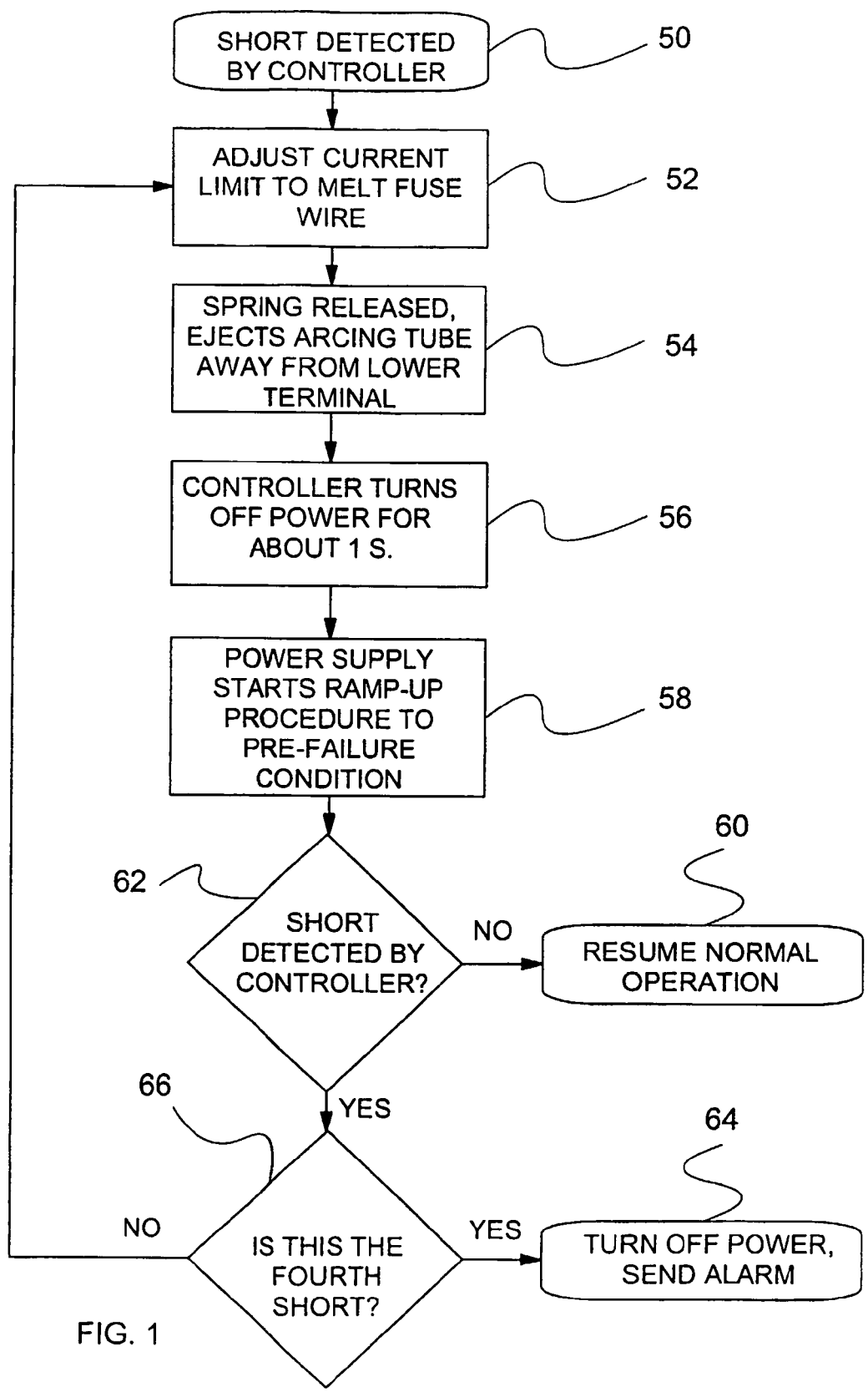
FIG. 1 is a flow chart of one embodiment of the method portion of the present invention.
Figure 2:
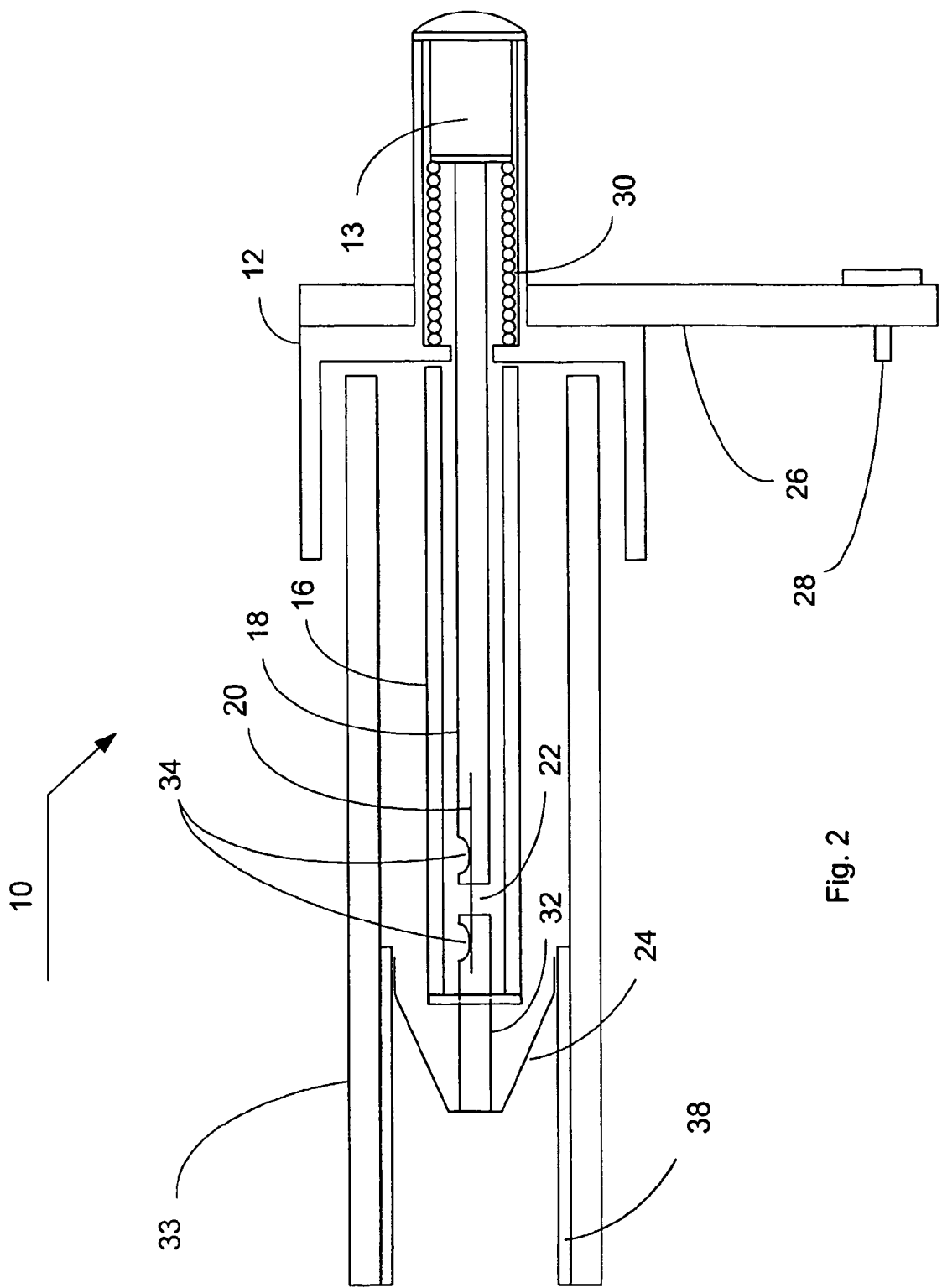
FIG. 2 is a cutaway view of one embodiment of a fuse link assembly according to the present invention.
Figure 3:
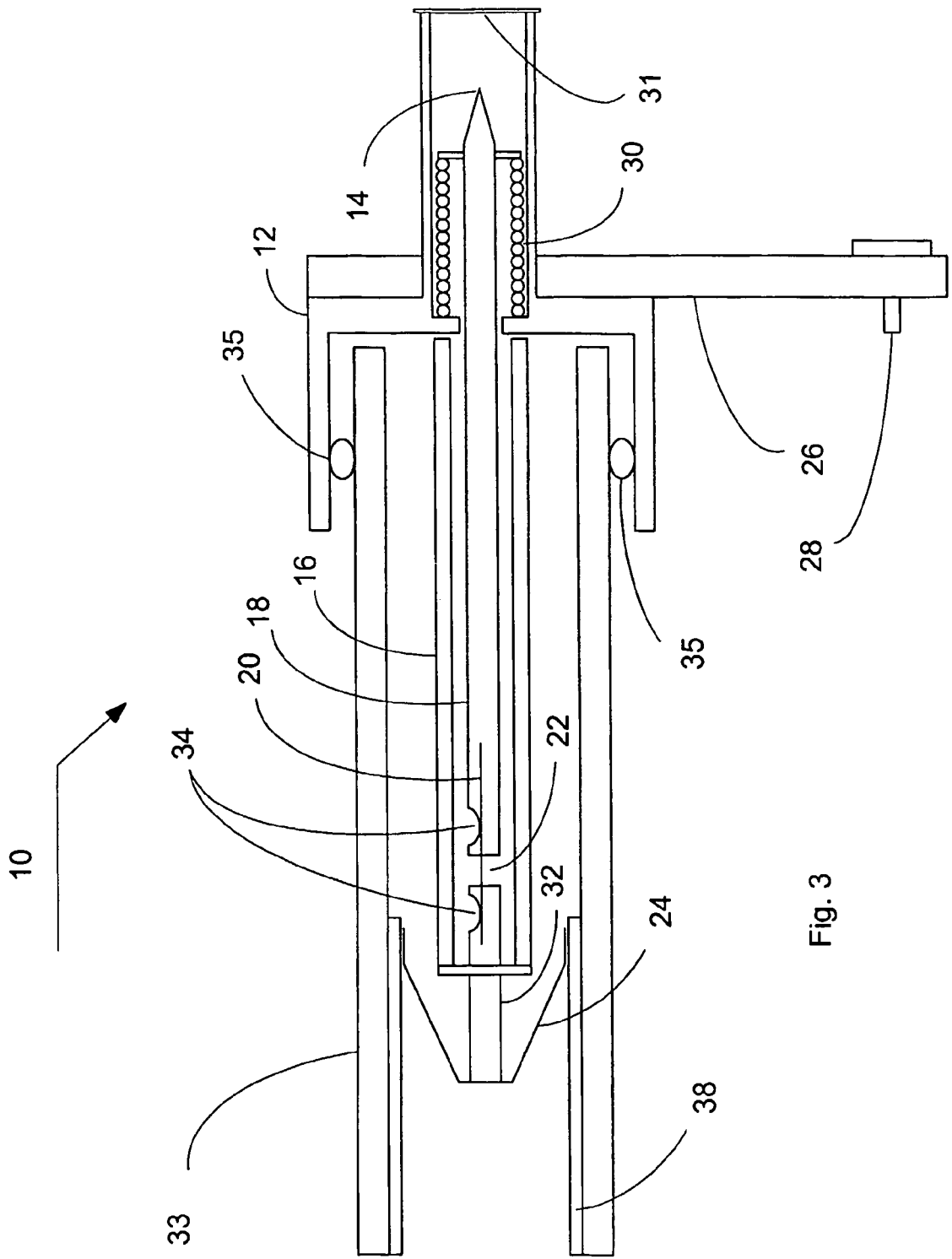
FIG. 3 is a cutaway view of another embodiment of a fuse link assembly according to the present invention.

The invention is a fuse means comprising a fuse link assembly 10 as shown in FIG. 2 and FIG. 3 that works in concert with a synchronized power supply response shown in FIG. 1 when the power supply controller senses a short circuit fault in an electrical discharge reactor. The reader is advised that the reference numbers mentioned in this Description may be found in any of the figures. The figure numbers themselves may not be specifically referenced.

In operation, an electrode failure in a discharge reactor results in a self-sustaining arc between an electrode and its associated ground tube. The arc is detected 50 as a short circuit by a power supply controller, preferably due to a change in the voltage to current ratio. The power supply controller then responds by going into a fuse blow sequence of operation. The controller adjusts the current limit 52 to a programmable value for a duration that is just sufficient to melt the fuse wire 20 (also called the strain wire). The duration and set point of the current during this phase are user selectable, and they are typically optimized to provide the least amount of current for the shortest time necessary to melt the fuse wire 20. These settings can be predicted based on published data from the fuse wire manufacturer, size of the discharge reactor, and the source impedance, but are preferably determined by testing. Melting the fuse wire 20 releases 54 a spring means 30 that ejects an arcing tube 18 away from a lower terminal 32 that is in electrical contact with an electrode conductor 38.

After the period of adjusted current, the controller preferably turns off the power 56 for about one second to ensure the extinction of any remaining electrical arc. After this momentary "arc quenching" period, the power supply commences a controlled output power ramp-up procedure 58 to return to the pre-failure power level set point. Should the power supply controller again detect a short circuit 62 condition during the ramp-up phase, it will preferably attempt to repeat the fuse blow sequence two more times. A short circuit condition detected during the fourth attempt 66 would result in the power supply shutting down 64 and, optionally, providing an alarm. If a short is not detected 62, the controller resumes normal operations 60.

FIG. 2 is a cutaway view of a fuse link assembly 10 according to the present invention. FIG. 2 does not show various gaskets, washers, and connectors presently used that are advantageous in the assembly and operation of the fuse means. The gaskets and connectors are useful for for preventing a corrosive atmosphere from contacting the fuse wire 20. The method of sealing the internal space 22 from the corrosive atmosphere is important.

High voltage AC current is distributed through a buss means (not shown) to any number of the electrodes electrically connected in parallel. In the preferred embodiment, the buss is a plate structure that resembles a tube sheet. The fuse link assembly 10 is centered within a ground tube by pinning its location with a pin 28 affixed to an electrode cap bracket 26. The electrode cap bracket 26 secures and maintains electrical communication with an electrode cap 12 that provides support and electrical connection to other fuse elements. The electrode cap 12 has a sliding fit, and is in electrical communication, with an arcing tube 18. A proximal end of a fuse wire 20 is secured to the arcing tube 18, preferably by swaging or crimping to make a crimp 34. Relying on the gas-tight construction of the electrode assembly, no specific corrosion-resistant alloy is needed in manufacturing of any fuse component internal to the assembly. The fuse wire provides an electrical connection between the arcing tube 18 and a lower terminal 32.

The distal end of the strain wire 20 is secured to the lower terminal 32, preferably by the same means as at the proximal end. A contact 24 is in mechanical and electrical communication with the lower terminal 32, and is adapted to contact the high voltage electrode conductor 38 of an electrical discharge reactor. The electrode conductor 38 could be a conductive wire mesh rolled and inserted inside a dielectric barrier tube.

A dielectric barrier 16 provides physical support for the arcing tube 18 and lower terminal 32, and effectively becomes a part of the high voltage electrode when installed into a reactor. The barrier 16 could also be made of an electrically insulating material. Before pinning it into the reactor, the contact 24 guides the fuse link assembly 10 into a slightly larger diameter dielectric barrier 33 having a conductive electrode 38 inside. Once the electrode cap 12 is seated against the larger diameter dielectric barrier 33, the space between the cap and the barrier is sealed by known practical methods to ensure a substantially gas-tight seal. The dielectric barrier 16 is preferably a tube made of quartz or fused silica.

In this particular embodiment of the invention, a rivet 13 is secured to the end of the arcing tube 18, and is adapted to prevent noxious or corrosive gases from entering the fuse link assembly 10. The term "rivet" as used in this specification is not limited to the familiar structural connectors, but is intended to include any rivet-shaped structure comprising a body of a particular diameter and a head with a larger diameter than the body. A gasket, o-ring, or other sealing means can be provided between the rivet 13 head and electrode cap 12.

A spring 30 is disposed in a space provided for that purpose between the rivet 13 head and electrode cap 12. The spring 30 is also in electrical communication with the electrode cap 12 and is secured to the arcing tube 18. The spring 30 is normally in compression until the strain wire 20 melts, which releases the spring to separate the lower terminal and arcing tube 18 by at least about 11 cm (4.5 inches) thereby establishing the necessary electrical isolation by means of air space clearance 22 between the failed electrode and the electrode cap 12 once the distribution buss plate is returned to the operating high voltage potential.

FIG. 3 shows a different embodiment of the fuse assembly 10. A gas sealing gland or gasket 35 is disposed between the electrode cap 12 and the dielectric tube 33. The gasket 35 can be an o-ring or caulking, and VITON brand material from duPont has been successful in testing. The spring 30 is disposed in a space provided for that purpose in the electrode cap 12, and is secured to a piercing end 14 of the arcing tube 18. Once assembled, the spring 30 is compressed and the tip of the piecing end 14 of the arcing tube 18 rests approximately 2.5 cm (1.0 inch) away from a sealing foil 31 that encloses one end of the electrode cap 12. The sealing foil 31 is secured to the cap 12 to prevent noxious or corrosive gases from entering the fuse link assembly 10. Like in the other embodiment, the spring 30 is normally in compression until the strain wire 20 melts, which releases the spring. As the arcing tube 18 ejects, the piercing end 14 will perforate the sealing foil 31. After the fuse has blown, the fuse internals need not be sealed against the outside gases.

The fuse link assembly 10 differs from other fuses for electrical discharge reactors that use a fine diameter fuse wire in that the present invention uses a spring 30 to eject the arcing tube 18 once the fuse wire 20 melts or vaporizes due to a short circuit. This feature, combined with proper power supply control response and means of sealing the fuse internals from corrosive gases, is suitably adapted to interrupt the current associated with a failed electrode at voltages applied to DBD reactors used in pollution control, which is typically up to about 60 kV peak-to-peak.

In high voltage applications, the molecular state of the gas separating two conductors determines whether sustained arcing can occur from one conductor to the other through the separation gap. If there is an ionized path in the gas between the two conductors, then it is possible to sustain an arc between conductors over a distance that would otherwise stand off the voltage. Immediately after vaporization 52 of the fuse wire 20 the voltage difference between the arcing tube 18 and the lower terminal 32 may be sufficient to establish an arc across the small gap established between the two conductors 22. As the arcing tube 18 is ejected 54 and travels through the fuse link dielectric barrier support 16, the distance between arcing tube 18 and the lower terminal 32 increases, but the power supply simultaneously increases the applied voltage in order to maintain the set current level, hence the arcing is sustained and the gas contained in the fuse link support 16 will continue to ionize. In turn, this enhances the conduction properties of the gas space, sustaining the process. To protect against this situation, the one-second shut down feature 56 is added to the power supply controller program to assure that any sustained arcs are extinguished prior to returning to normal operating conditions 60.

The power supply control features are optional features of the present invention, but are preferable for the case of using a DBD reactor to treat flue gases from a fossil fueled boiler. It is possible that the apparatus 10 alone, or the apparatus with only the set back period at lowered current limit 52, will be a sufficient fuse means for a particular discharge reactor application. A user of the present invention would be motivated to try to do so.

The present invention has many benefits over the prior art. First, it provides fuse protection to electrical discharge reactors used for pollution control where none was available before. It protects the power supply and discharge reactor from damage. It also isolates an individual electrode without bringing down the whole reactor and the plant to which it is attached. Significantly, once the plant has been shut down for scheduled maintenance, it is easy to see which fuses have blown because there is an arcing tube end that protrudes out of the end of the electrode. Without the protruding arcing tube end, it would be extremely difficult for maintenance personnel to visually locate the failed electrode. Another benefit is that, given the gas-tight seal of the fuse, the fuse internals are protected from the corrosive environment, and these components can be fabricated using inexpensive steel, thus saving cost. In addition, the fuse link assembly 10 is provided as a unitary structure that can be packaged and installed as a unit without wiring, soldering, or performing other complex electrical connections on site.

It will be apparent to those skilled in the art that various changes and modifications can be made without departing from the spirit of the present invention. Accordingly, it is intended to encompass within the appended claims all such changes and modifications that fall within the scope of the present invention.

We claim:

1. A fuse method for protecting an electrical discharge reactor operating at an applied peak-to-peak AC voltage and having a plurality of electrodes comprising the steps of
   detecting that a short circuit has occurred in an electrical discharge reactor,
   adjusting a current sent through a fuse for a time and current sufficient to assure that the fuse melts,
   ejecting an arcing tube in electrical communication with the fuse a distance sufficient to stand off the applied voltage to take that particular electrode out of a reactor circuit,
   stopping the current flow for a time sufficient to quench an arc, and
   restoring a power supply to remaining electrodes to pre-short circuit output levels using a ramp-up procedure.

2. The method of claim 1 further comprising the step of detecting whether a short exists after commencing the restoring step.

3. The method of claim 2, further comprising the step of resuming normal operations if no short is detected during the restoring step.

4. The method of claim 2, further comprising the step, if a short is detected during the restoring step, of determining whether it is a fourth short detected since the previous ejecting step, and if not, returning to the step of adjusting a current limit of a power supply controller to melt the fuse.

5. The method of claim 4, further comprising the step, if the determining step determined that it is the fourth short detected since the previous ejecting step, turning off power from the power supply controller.

6. The method of claim 1, wherein said ejecting step is performed by a spring that is released during the current adjusting step.

\* \* \* \* \*